United States Patent
Calderone et al.

(10) Patent No.: US 7,260,538 B2
(45) Date of Patent: Aug. 21, 2007

(54) METHOD AND APPARATUS FOR VOICE CONTROL OF A TELEVISION CONTROL DEVICE

(75) Inventors: Theodore Calderone, San Carlos, CA (US); Mark J. Foster, Palo Alto, CA (US); Harry William Printz, San Francisco, CA (US); James Jay Kistler, San Jose, CA (US)

(73) Assignee: Promptu Systems Corporation, Menlo Park, CA (US)

( * ) Notice: Subject to any disclaimer, the term of this patent is extended or adjusted under 35 U.S.C. 154(b) by 719 days.

(21) Appl. No.: 10/338,591

(22) Filed: Jan. 7, 2003

(65) Prior Publication Data
US 2003/0167171 A1   Sep. 4, 2003

Related U.S. Application Data

(60) Provisional application No. 60/346,899, filed on Jan. 8, 2002.

(51) Int. Cl.
*G10L 15/00* (2006.01)

(52) U.S. Cl. ............................... 704/275; 348/14.05

(58) Field of Classification Search ................ 704/275; 348/14.05
See application file for complete search history.

(56) References Cited

U.S. PATENT DOCUMENTS

| | | | | |
|---|---|---|---|---|
| 5,267,323 A * | 11/1993 | Kimura | ...................... | 381/110 |
| 5,774,859 A * | 6/1998 | Houser et al. | .............. | 704/275 |
| 5,832,439 A | 11/1998 | Cox | | |
| 6,253,174 B1 * | 6/2001 | Ishii et al. | ................... | 704/231 |
| 6,397,186 B1 * | 5/2002 | Bush et al. | ................. | 704/274 |
| 6,415,257 B1 | 7/2002 | Junqua | | |
| 7,006,974 B2 * | 2/2006 | Burchard et al. | ........... | 704/275 |

* cited by examiner

*Primary Examiner*—Daniel Abebe
(74) *Attorney, Agent, or Firm*—Michael A. Glenn; Glenn Patent Group

(57) ABSTRACT

A method and apparatus is disclosed for remotely processing voice commands for controlling a television. A voice command is uttered by a user into a microphone contained in a remote control. The voice command is digitized, modulated, compressed, and wirelessly transmitted to a wireless receiver connected to a set-top box. The voice command is then transmitted to a cable head-end unit for voice and word recognition processing. Once the command function is determined, the function is transmitted back to the set-top box where the set-top box performs the command. The microphone is activated and deactivated by pressing and releasing a push-to-talk (PTT) switch. The PTT activates other functions by being turned, double-clicked and toggled up and down, left and right.

41 Claims, 6 Drawing Sheets

METHOD AND APPARATUS FOR VOICE CONTROL OF A TELEVISION CONTROL DEVICE

CROSS-REFERENCE TO RELATED APPLICATION

This application claims priority to U.S. Provisional Patent Application No. 60/346,899 filed on Jan. 8, 2002.

BACKGROUND OF THE INVENTION

1. Technical Field

The invention relates generally to voice controlled electronic devices. More particularly, the invention relates to a voice-controlled set-top box and remote control for performing television related processes.

2. Description of the Prior Art

Speech recognition systems are capable of recognizing words spoken by human beings. Isolated word recognition systems have been developed to recognize and discriminate isolated words, i.e. words separated by a pause, which have been trained into the systems. Such s speech recognition device is summarized in D. Raj Reddy, *Speech Recognition by Machine: A Review*, Proceedings of the IEEE, April 1976, pages 501-531. Connected word recognition systems are capable of recognizing and discriminating individual words from spoken phrases.

It is also known to use voice recognition systems to control system variables of various active systems. Speech recognition control system and method, U.S. Pat. No. 4,605,080, Lemelson, Aug. 12, 1986, discloses a weighing scale involving calculating functions that include an automatic control system that can accept spoken words as input. A speech recognition system is used for processing and analyzing speech signals output by a microphone. The microphone is connected to a speech recognition computer that outputs and applies select command control signals to effect desired control functions. It is disclosed to control conveyors to place labels on containers automatically using the speech recognition system. The apparatus may be controlled to stop and start, slow down or speed up by an operator speaking the appropriate voice commands into a microphone.

Voice controlled welding system, U.S. Pat. No. 4,641,292, Tunnell, et al., Feb. 3, 1987 discloses an apparatus and method for permitting human voice control of a welding system. It is disclosed that a human operator is provided with an audio transmitter by which the operator adjusts the welding power supply through voice commands. The voice commands are issued by the operator and transmitted through a receiver to a voice recognition unit. The received signal is interpreted by a computer that is electrically connected to deliver power control signals to the welding power supply, and thereby adjusts the power delivered to the welding head. The operator may also issue voice commands to start and stop an internal combustion engine that drives the welding power supply, when such an engine is used.

A problem with the prior art voice recognition systems is that they require a sophisticated voice recognition system in close proximity to the user, requiring individual units which is quite costly. What is needed is a centralized voice command processing system such services a multitude of users.

A problem with television remote controls is their ever-increasing size. As remote controls become more sophisticated, more and more functions are added. As more functions are added, more buttons are added, causing the aforementioned increase in size. Remote controls are now approaching a practical limit. Moreover, remote control manufacturers have standard template designs for their remote controls. The standard designs dictate where the buttons are located, as well what functions will exist. What is needed is a way to add functions to an existing remote control without greatly increasing its size and without interfering with existing manufacturer designs.

A problem with voice command remote control systems is that they are activated when a sound input reaches a pre-determined amplitude. Often, ambient noise reaches the pre-determined level and the system is unintentionally activated. This leads to inadvertent input and a misuse of processing power because the speech recognition unit attempts to process the noise. What is needed is way to activate and deactivate a voice command system that is not substantially affected by ambient noise.

SUMMARY OF THE INVENTION

A method and apparatus is disclosed for remotely processing voice commands for controlling a television. A voice command is uttered by a user and is received by a microphone contained in a television set-top box remote control. The voice command is modulated and wirelessly transmitted to a wireless receiver connected to the set-top box. Either before or after this transmission, it is digitized and compressed. Examples of compression algorithms used are low bit-rate encoding and conversion into cepstrals. The voice command is then transmitted, for example, to a central processing station located at a cable television head-end unit. A computer at the cable head-end unit processes the voice command for voice command recognition. Once the voice command is determined a command function is created. The command function is transmitted back to the set-top box where the set-top box performs the command function. Alternatively, the set-top box just passes on the command and the head end performs or carries out the command.

The microphone is activated by the depression of a push-to-talk (PTT) button or by word activation. Releasing the PTT button deactivates the microphone. Optionally, the PTT button can be turned to adjust the gain control on the microphone and can be toggled to activate wireless phone functions of the remote control. Double pressing the PTT button activates other functions, for example a help menu for television viewing.

DESCRIPTION OF THE PREFERRED EMBODIMENT

Figure 1:
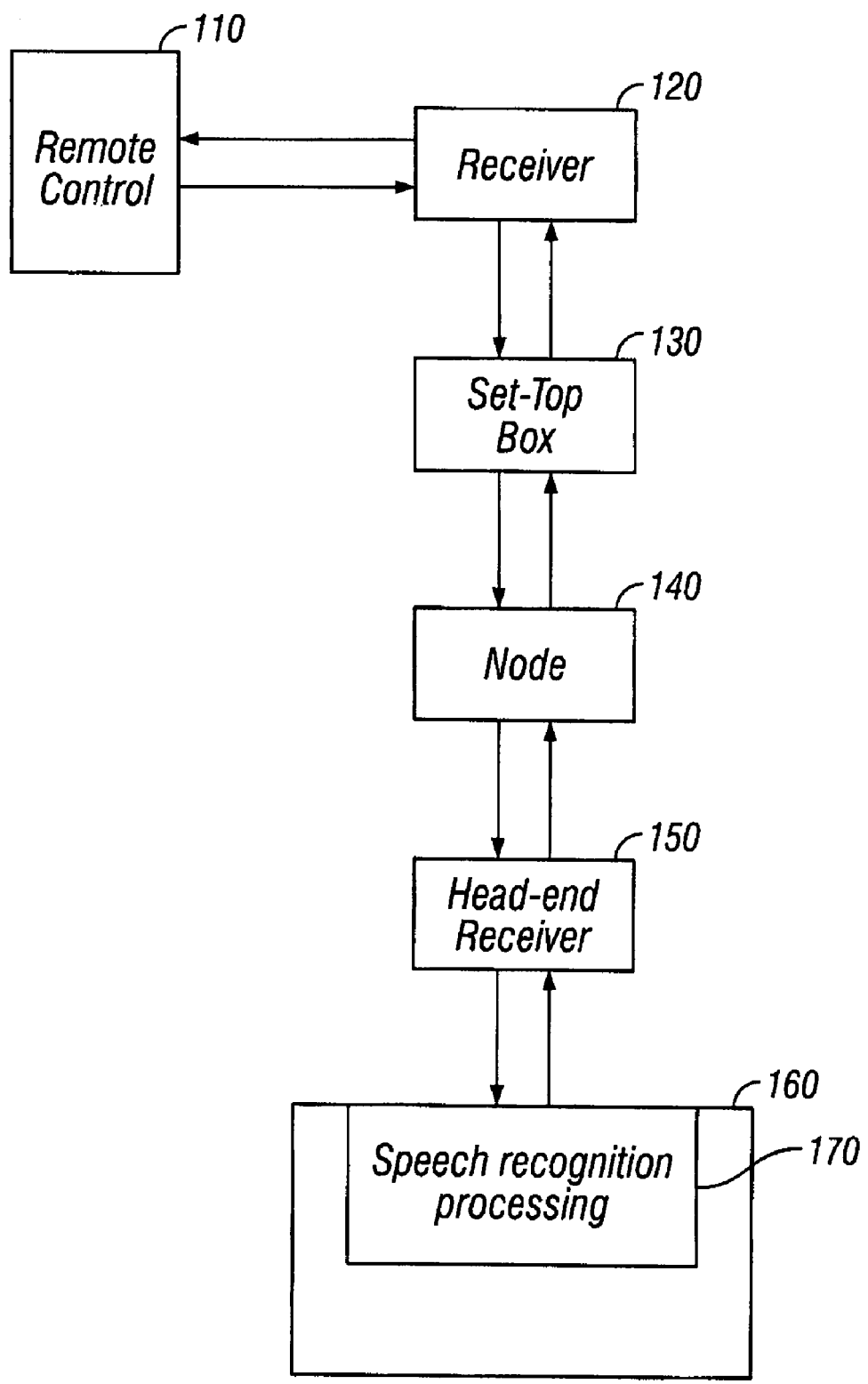
FIG. 1 is a diagram illustrating elements of the voice control television system according to the invention.

FIG. 1 is an operational diagram illustrating a preferred embodiment of the voice control system which, for purposes of example, is an interactive television voice control system. Those skilled in the art will appreciate that other systems may be used in connection with the invention herein, such as information browsing system and representational process control systems.

A remote control 110 receives voice commands from a user through a microphone preferably located within the remote control 110. The remote control wirelessly transmits the voice commands to a wireless receiver (RECEIVER) 120 that converts the wireless signal to a wired signal. The wireless transmission is typically infrared. Ultrasonic, radio, or other wireless transmissions are also contemplated.

The RECEIVER 120 transmits the voice command to a television controller such as a set-top box 130. Transmissions between the RECEIVER and the set-top box may be unidirectional or bi-directional. The RECEIVER 120 transmits to the set-top box 130 when the RECEIVER 120 receives a transmission from the remote control 110. Alternatively, the RECEIVER transmits to the set-top 130 after a specified period of time has elapsed when the RECEIVER 120 is not receiving a transmission from the remote control 110. The set-top box 130, RECEIVER 120 and remote control 110 may be capable of both receiving and transmitting data simultaneously. The functions of the RECEIVER 120 may also be incorporated into the television set-top box 130.

In a preferred embodiment, the RECEIVER 120 is connected and transmits to the set-top box 130 through a serial, USB, or other connection. In another preferred embodiment, the RECEIVER 120 communicates to the set-top box 130 through the modem interface using a modem emulator and modem protocols. Set-top boxes, such as the DCT-2000 produced by Motorola of Schaumburg, Ill., provide such a modem interface. In another embodiment, the RECEIVER 120 communicates wirelessly to the set-top box 130. A wireless receiving interface receives wireless transmission from the RECEIVER 120 and transmits the transmissions to the set-top box 130. This may occur, for example, by means of a physical connection.

The RECEIVER 120 contains a buffer that stores the voice commands. Alternatively, the buffer is a separate unit from the RECEIVER 120, or is contained in the set-top box 130 or the remote control 110. Voice transmissions are either analog or digital, and are typically modulated. Modulation types include amplitude modulation, frequency modulation, pulse-position modulation (PPM), and pulse code modulation (PCM). Modulation is performed at any of the remote control 110, the set-top box 130, or the RECEIVER 120. A compression scheme may be used to compress the voice command. The compression is performed at any of the remote control 110, the set-top box 130, the RECEIVER 120 or at a head-end unit 160. It is also contemplated that a dedicated component may be provided that performs analog-to-digital conversions.

The voice commands are transmitted from the set-top box 130 to a node 140, a head-end receiver 150 and to a head end unit 160 along a cable television uplink, where speech recognition processing 170 is performed. In the preferred embodiment, speech recognition processing includes user voice identification and word recognition. Word recognition includes probability or semantic analysis checking especially where a voice command contains multiple words. The probability checking checks that the words logically go together.

The central processing station is designed to handle a multitude of voice command inputs from a multitude of cable television users. After the voice command is processed, the central processing station 160 sends a corresponding command function to the cable set-top box 130 or other system component where the command is then performed.

Figure 2:
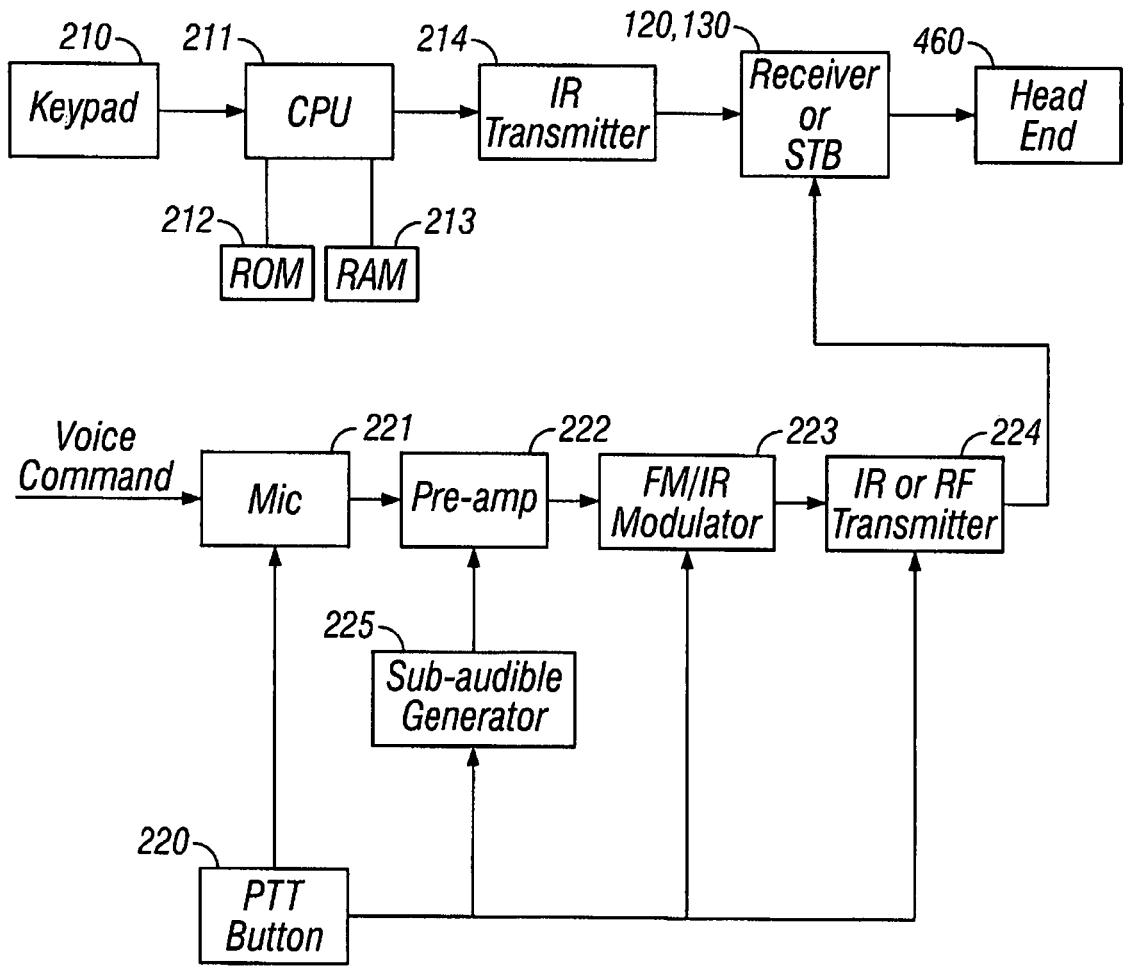
FIG. 2 is a diagram illustrating a remote control for transmitting an analog voice command according to the invention.

FIG. 2 illustrates one embodiment of the remote control, where an analog signal is transmitted from the remote control to a head end unit 460 for processing. The remote control 110 may include a keypad 210 that allows a user to perform such tasks as entering numerical values, adjusting the volume, and changing the channels. The keypad entries are processed by a CPU 211 that has a ROM 212 and RAM 213 electronically coupled to it. The CPU functions are typically either hardware implemented or an embedded software solution. The processed keypad entries are transmitted by infrared 214 to a RECEIVER 120, or to a set-top box 130 that can receive infrared transmissions.

A push-to-talk (PTT) button 220 activates the microphone 221 on the remote control, as well as activating a pre-amp 222, modulator 223, transmitter 224, and optionally, a sub-audible generator 225. The PTT button 220 brackets the voice command by indicating a beginning when depressed, and an end when released. The bracketing of the speech provides a higher signal to noise ratio because unintended noise at the beginning and end of the transmissions are eliminated. When the PTT button 220 is released, the microphone 221, pre-amp 222, modulator 223, transmitter 224 and sub-audible generator 225 are deactivated optionally after a suitable delay.

A voice command received by the microphone 221, is processed by the pre-amp 222, modulated 223, and transmitted 224 to the receiver 120 or set-top box 130. If the transmitter 224 is a radio frequency (RF) transmitter, then the modulator 223 is, for example, an FM modulator. If the transmitter 224 is an infrared transmitter, then the modulator 223 is an infrared modulator.

If present, the sub-audible generator 225 produces a sub-audible tone. The voice command and sub-audible signal are combined in the pre-amp 222. The voice command and sub-audible signal may also be combined in either in the set-top box 130 or in the RECEIVER 120. The sub-audible tone indicates to the receiver or head-end unit 460 that the microphone is on air and that the user is producing voice commands. Alternatively, the on-air status of the microphone may be detected by other means, such as carrier detection. The combined signal is transmitted to the RECEIVER 120 or to a set-top box 130 that can receive wireless transmissions.

Figure 3:
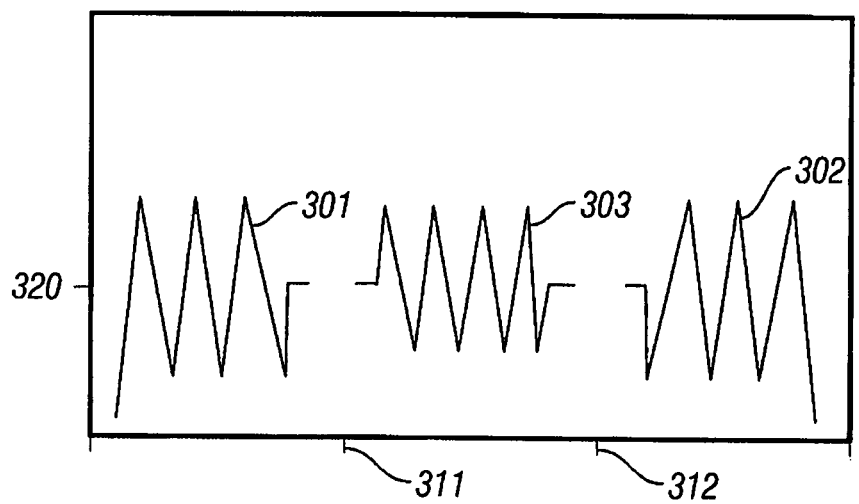
FIG. 3 is a graph illustrating a voice command and noise.

FIG. 3 is graph that illustrates a voice command 303 and noise 301, 302 that precedes and comes after the voice command. In a typical voice activated system, the microphone is activated when an audible sound reaches predetermined amplitude 320. Thus, in an amplitude activated system, the noise 301, 302 and voice command 303 all activate the microphone. However, with a PTT button, only the depression 311 of the button activates the microphone, and the release 312 of the button deactivates the microphone. Thus the microphone does not receive the unwanted noise 301, 302.

Figure 4:
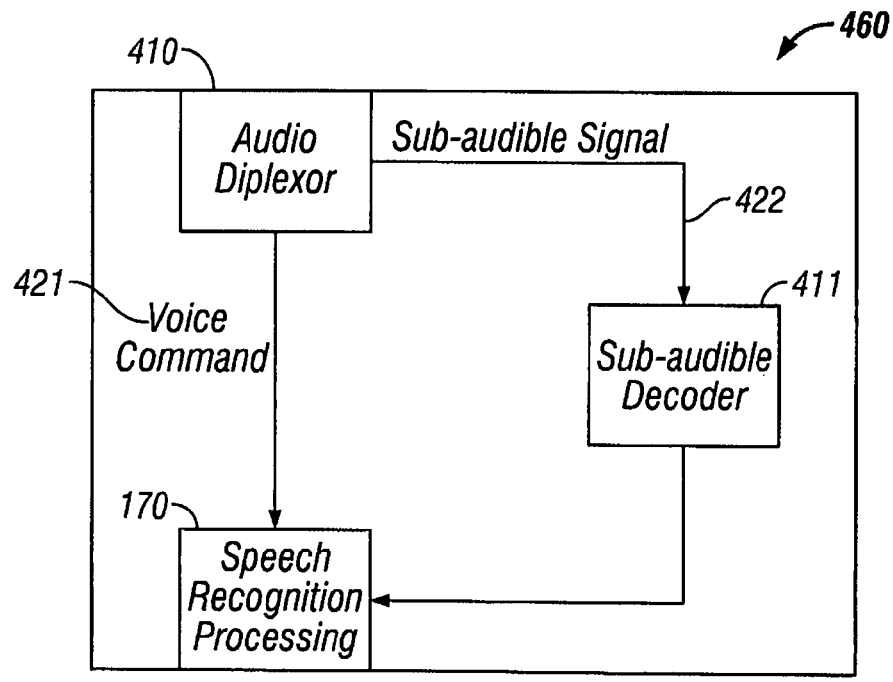
FIG. 4 is a diagram illustrating a head-end unit for processing an analog voice command according to the invention.
Figure 5:
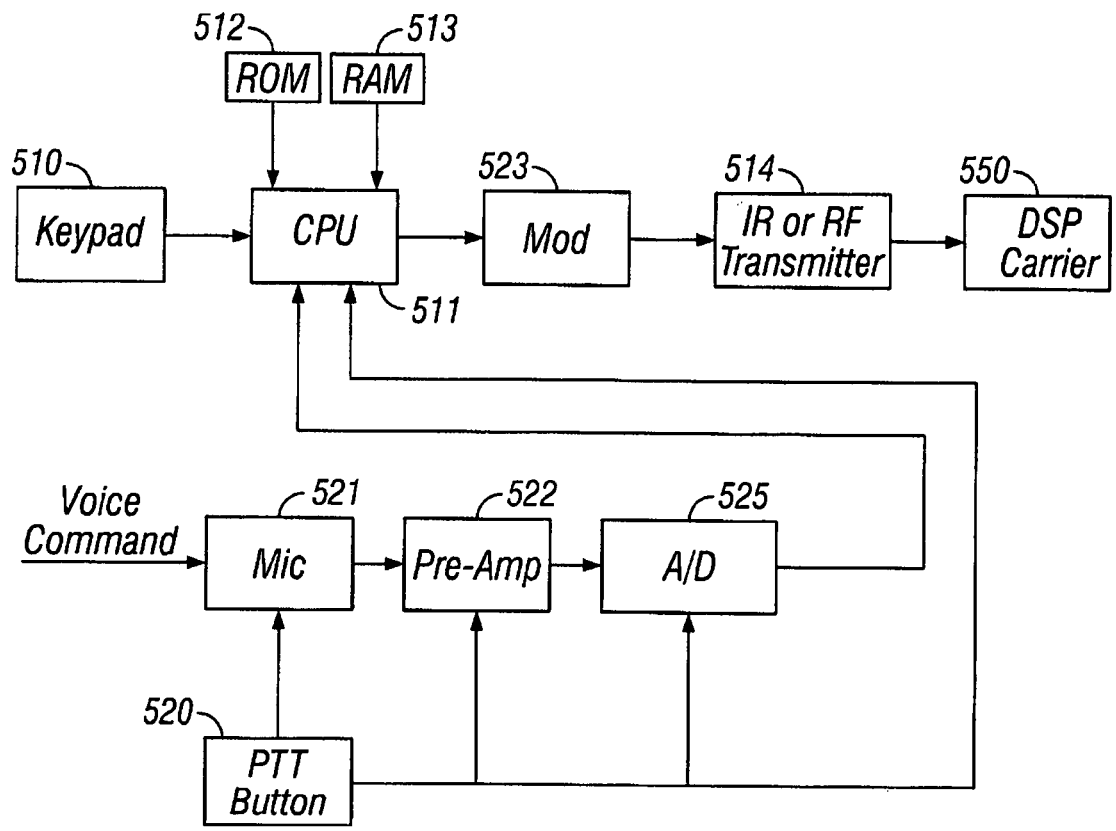
FIG. 5 is a diagram illustrating a remote control for transmitting a digital voice command according to the invention.

FIG. 4 illustrates a head-end unit 460 for processing an analog voice command. An audio diplexor 410 receives the transmissions and divides the signal into the voice command 421 and the sub-audible signal 422. A sub-audible decoder 411 processes the sub-audible signal 422. The sub-audible signal 422 contains information, such as the source of the transmission, and also indicates that the transmission is active. The head-end unit processes 170 the voice command and decoded sub-audible signal information, and determines a command function FIG. 5 illustrates a remote control that transmits a digital signal to a head-end unit 660 for processing. Keypad entries 510 are processed by a CPU 511 to which a ROM 512 and RAM 513 is electronically coupled. The processed keypad entries are modulated 523 and transmitted 514 by infrared or RF to a digital server provider (DSP) carrier 550.

A PTT button 520 activates a microphone 521, pre-amp 522, and analog-to-digital converter 525. The microphone 521 receives a voice command and transmits it to a pre-amp 522. The pre-amp 522 transmits the voice command to the analog-to-digital converter 525 where the voice command is converted from analog to digital. The digital voice command is transmitted to the CPU 511 where header and footer information is added. A unique digital signature in the header identifies the remote control. Header information is typically stored in the ROM 512. The CPU 511 transmits the digital command to a digital service provider (DSP) carrier 550 either through an infrared or RF transmitter. The DSP carrier 550 is part of either the wireless receiver, the set-top box or may be a separate unit.

In considering FIG. 2 and FIG. 5, it is noted that a hybrid system is also envisioned, in which the remote control transmits analog speech to the receiver where it is digitized and sent in digital format to the head-end.

Figure 6:
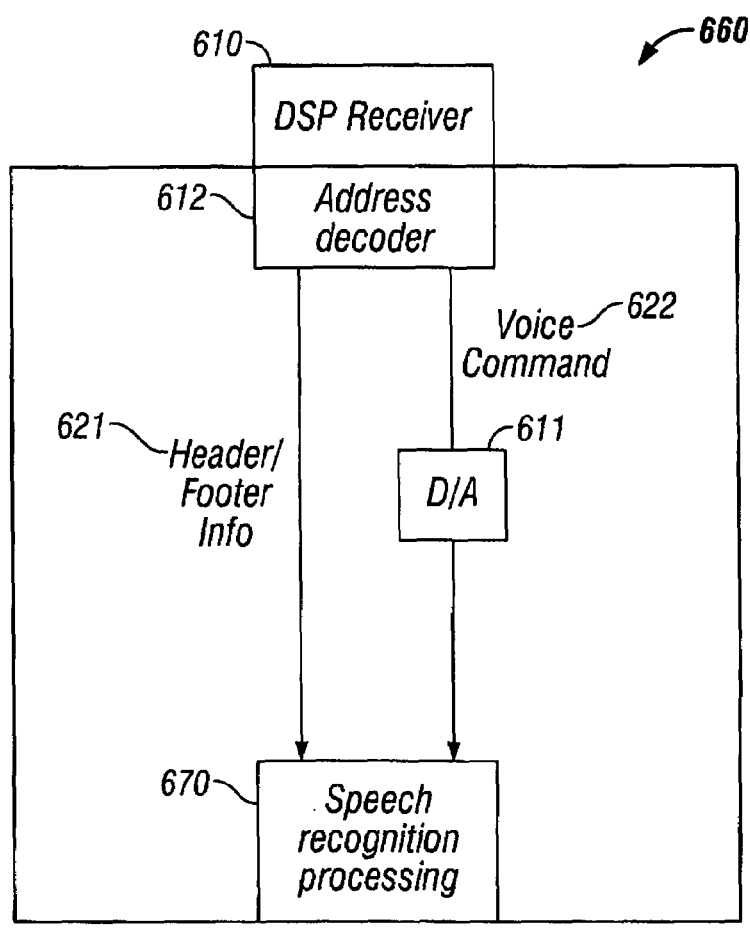
FIG. 6 is a diagram illustrating a head-end unit for processing a digital voice command according to the invention.

FIG. 6 illustrates a head-end unit 660 for processing a digital voice command. A digital DSP receiver 610 receives the digital signal and transmits the signal to an address decoder 612. The address decoder separates and interprets the header and footer information 621 from the digital voice command 622. The voice command portion 622 of the signal is transmitted to a digital-to-analog converter 611. The digital-to-analog converter 611 transmits the analog voice command to a speech recognition processor 670 where it analyzed for voice command recognition, and a command function is derived.

A transmission is cepstral analyzed for the purposes of facilitating the computer analysis of speech for voice recognition. Cepstral analysis is a method of feature extraction that is known in the art. Cepstral analysis, or feature extraction, is performed on a digitized speech signal and results in a representation of the signal that characterizes the relevant features of the speech. It can be regarded as a data reduction procedure that retains vital characteristics of the speech and eliminates undesirable interference from irrelevant characteristics of the digitized signal, thus easing the decision-making process of a computer. An example of a preferred method of cepstral analysis is disclosed in Wang, Method of training neural networks used for speech recognition, U.S. Pat. No. 5,509,103, Apr. 16, 1996.

Typically, a remote control contains an existing infrared transmission method for transmitting keypad entries to a set-top box. Using the existing infrared transmitter alone is insufficient for voice commands as the transmission rate is approximately 1200 baud. Thus, a dedicated transmission method is used to transmit the voice commands from the remote control to the receiver.

Examples of transmission methods include infrared, FM radio, AM radio and ultrasonic. In one embodiment, a high digital signal rate is used for the transmissions, such as burst transmissions. In another embodiment, a high data rate is achieved by sending multiple signals simultaneously in the form of a multiplexed signal.

In a preferred embodiment, Bluetooth transceivers are used to facilitate communication between the remote control 110 and the RECEIVER 120. Bluetooth defines a universal radio interface in the 2.45 GHz Industrial-Scientific-Medical (ISM) frequency band. Specific portions of this bandwidth are available on an essentially global basis. Thus, Bluetooth-capable systems operate internationally. Bluetooth permits disparate electronic devices or systems to communicate with each other via short-range communications. A group of two or more devices in local communications with each other using Bluetooth, form a Bluetooth network, referred to as a piconet. A piconet comprises up to eight Bluetooth devices, with one device serving as the master and the remaining devices acting as slaves in the piconet. A given Bluetooth device in a given piconet may alternately participate in other piconets, with a group of piconets referred to as a scatternet.

While those skilled in the art may understand and practice the present invention absent detailed presentation of Bluetooth specifications, the papers *Bluetooth—The universal radio interface for ad hoc, wireless connectivity*, by Jaap Haartsen, Ericsson Review No. 3, 1998, pp. 110-117, and *Ericsson's Bluetooth Modules*, by Arfwedson and Sneddon, Ericsson Review No. 4, 1999, pp. 198-205, provide substantial detail regarding the implementation and operation of Bluetooth transceivers. Additional Bluetooth technical specifications may be obtained by accessing a Bluetooth Special-Interest-Group (SIG) website at http://www.bluetooth.com.

Figure 7:
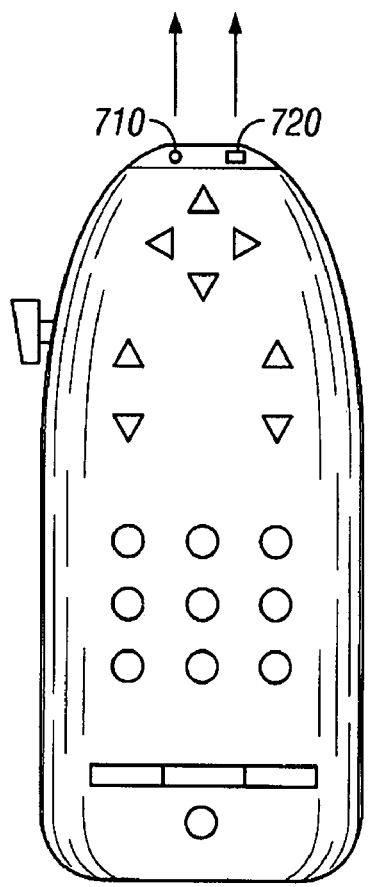
FIG. 7 is a diagram illustrating a remote control that transmits a voice command through a keypad transmitter and a dedicated voice transmitter according to the invention.

FIG. 7 illustrates another preferred embodiment where a voice command is simultaneously transmitted over both a dedicated voice transmitter 710 and an existing keypad transmitter 720. Transmitting with both the dedicated and existing transmitter increases the baud rate of the transmission. In one embodiment, the voice command transmission is divided between the two transmitters.

In another embodiment, where the remote control transmits an analog signal, the existing keypad transmitter 720 transmits the sub-audible PTT signal, while the dedicated voice transmitter 710 transmits the voice command.

In another embodiment, the transmitters transmit at different frequencies. The RECEIVER has two receivers. One receiver receives transmissions at the dedicated voice transmitter frequency, while the other receiver receives transmissions at the existing keypad transmitter frequency.

In yet another embodiment the transmitters transmit at the same frequency. Each transmission is out of phase with the other. A single receiver at the RECEIVER receives both signals. Each signal has a header that defines how the transmissions are constructed, and how they should be combined.

The remote control 110 may have the ability for bi-directional communication with the RECEIVER 120. If so, the bi-directional communication allows the transmission of information from the RECEIVER 120 to the remote control 110. The bi-directional communication may be accomplished by using the Bluetooth standard when radio transceivers are used, and by TWIRP, produced by SolutioNet, Ltd. of Williston, Vt., when infrared receivers and transmitters are used. Transmissions sent to the remote control are typically command functions. The command functions are used to control remote control functions such as the gain control.

The command functions may also be used to control the functions of other electrical devices. In one embodiment, the remote control relays command functions to electrical devices that are already capable of being controlled by a wireless control, for example, a stereo. In this example, the command functions include turning the stereo on and off, adjusting the volume, switching stereo functions and changing radio stations. Alternatively, the command functions may be relayed via a wired "IR blaster" transmitter connected to theremote or set-top box.

Figure 8:
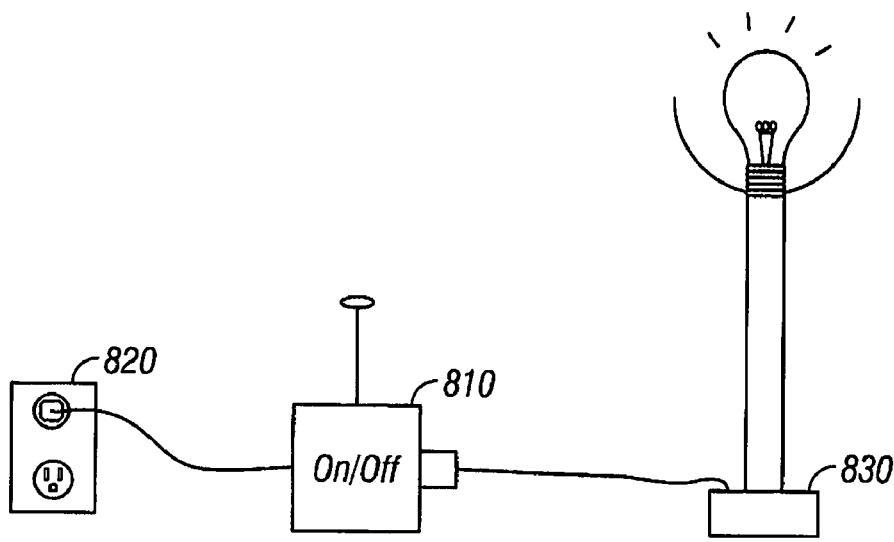
FIG. 8 is a diagram illustrating a control receiver according to the invention.

FIG. 8 illustrates another embodiment where the command functions control electrical devices that do not have an existing wireless control method. The remote control transmits command functions to a control receiver 810 that is connected in-line between an electrical device such as a light 830 and a power outlet 820. The command functions turn the power on and off to the device. For example, a user wishes to turn a light on. The user would say into the remote control, "lights on." The head-end unit would process the voice command and send a control function back to the remote control or IR blaster. The remote control transmits the control function to the control receiver 810 where it switches the power on to the light 830.

In another preferred embodiment a word recognition unit activates the microphone upon the speaking of a specific word. For example, when the word "agile" is spoken, the microphone is turned on. Once turned on, the microphone stays on continuously during speech, and turns off five seconds after the last word is spoken. The word recognition unit is typically constructed of a voice processor and a buffer. The unit is activated when the amplitude of speech reaches a predetermined level, similar to voice activation devices found in tape recorders. In this way, the remote control uses less power because the word recognition unit is not always on. Also, to reduce costs and weight, a low level processor is used with limited speech recognition. However, as processor speeds increase, and die sizes are cast smaller, more powerful processors may be used.

In another embodiment of the invention, low-bit rate audio encoding is used for non-repudiation purposes. Non-repudiation provides a method to guarantee that a party to a transaction cannot falsely claim that they did not participate in a transaction. Traditionally, handwritten signatures are used to ensure this. When a consumer writes a check, presenting a driver's license ensures the identity of the writer, i.e. authentication, while the signature on the check ensures that the consumer was in fact present and agreed to write the check, i.e. non-repudiation. When a user utters a voice command, the low-bit rate encoding is used to mark the transaction. Such marking is typically used when a user orders a pay-per-view event or other transaction involving goods or services for a fee. The low bit-rate recording serves as a non-memory intensive way of recording the user's voice command.

Non-repudiation is also performed by identifying the source of the voice command through an identification code that is attached in the header of a voice command. A user may also be required to enter on the remote control keypad an identifying code, such as the user's home phone number or "PIN" number.

Figure 9:
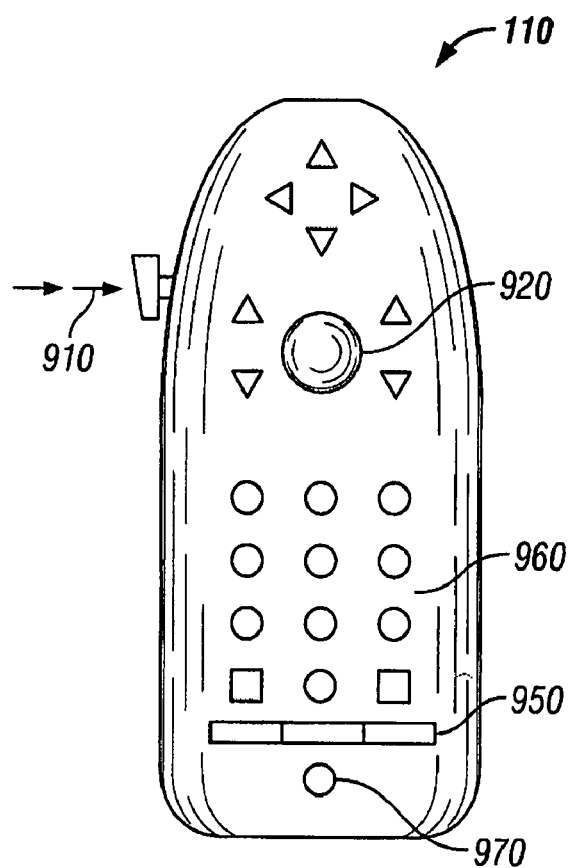
FIG. 9 is a diagram illustrating a frontal view of a remote control with a multi-function push-to-talk button according to the invention.
Figure 10:
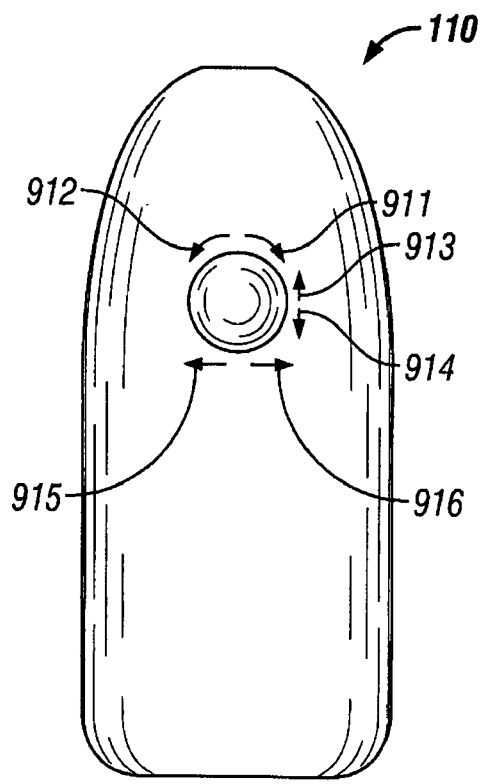
FIG. 10 is a diagram illustrating a side view of a remote control with a multi-function push-to-talk button according to the invention.

FIGS. 9 and 10 illustrate another preferred embodiment of the invention, where multiple functions are associated with the PTT button 910. The primary function of the PTT button is to engage and disengage a command pathway for a voice command from the user to the head-end unit. Other functions are also activated by manipulation of the PTT button.

An on-screen help menu is activated by double clicking the PTT button 910 in rapid succession to provide, for example, a help screen. The help screen typically provides information on how to use the system and also provides program information.

Optionally, the PTT button 910 may also adjust the sensitivity of the microphone. A clockwise turn 911 of the button increases the sensitivity while a counter-clockwise turn 912 decreases it. The sensitivity can be decreased to a degree such that the microphone is muted. An indicator 950 is located on the remote control or receiver can be used to indicate the amplitude of a user's voice command. The indicator lets a user know whether his voice command meets the minimum amplitude required for an accurate and process able recording. The PTT button 910 also functions as a shift button. Thus, depressing the PTT button 910 along with pressing keypad buttons 960 on the remote control, gives the keypad buttons 960 a secondary function.

Optionally, the remote control may also functions as a wireless phone. Toggling the PTT button upward 913 turns the phone on, and a user is able to dial a phone number using the remote control keypad. Toggling the button downward 914 turns off the phone. After a user releases the PTT button from its toggled position, the PTT button returns to a middle, default position. The microphone 970 functions as a phone receiver and a speaker 920 on the remote control allows the user to hear a phone transmission. The RECEIVER functions 120 as the base station for wireless phone functions. The RECEIVER 120 connects to a phone jack using a standard telephone wire. The wireless phone transmissions are transmitted to the receiver using the same communication pathways that the voice commands use.

In one embodiment of the invention, infrared repeaters are used to improve the performance of an infrared remote control. Infrared repeaters are placed throughout the operating environment of the remote control and RECEIVER. When a user uses a keypad function, it is natural for a user to point the remote control at the RECEIVER of the set-top box making the need for infrared repeaters unnecessary. However, when speaking into the remote control, a user's tendency is to place his mouth in close proximity to the microphone on the remote control. In most cases the infrared transmitter is not aimed towards the RECEIVER. The placement of the infrared repeaters ensures that the RECEIVER receives the infrared transmission from the remote control.

In a preferred embodiment the PTT button is a metal switch that activates the microphone transmission functions by engaging mechanical contacts. Switches of this type suffer from bounce. Hardware and software solutions exist for debouncing the switch. One example of a hardware debouncing solution is a circuit that has an RC time constant that swamps out the bounce. A typical software solution runs a routine that kills time long enough to allow the contacts to stop bouncing. These examples are not meant to be exhaustive but merely illustrative of what exists in the art.

Figure 11:
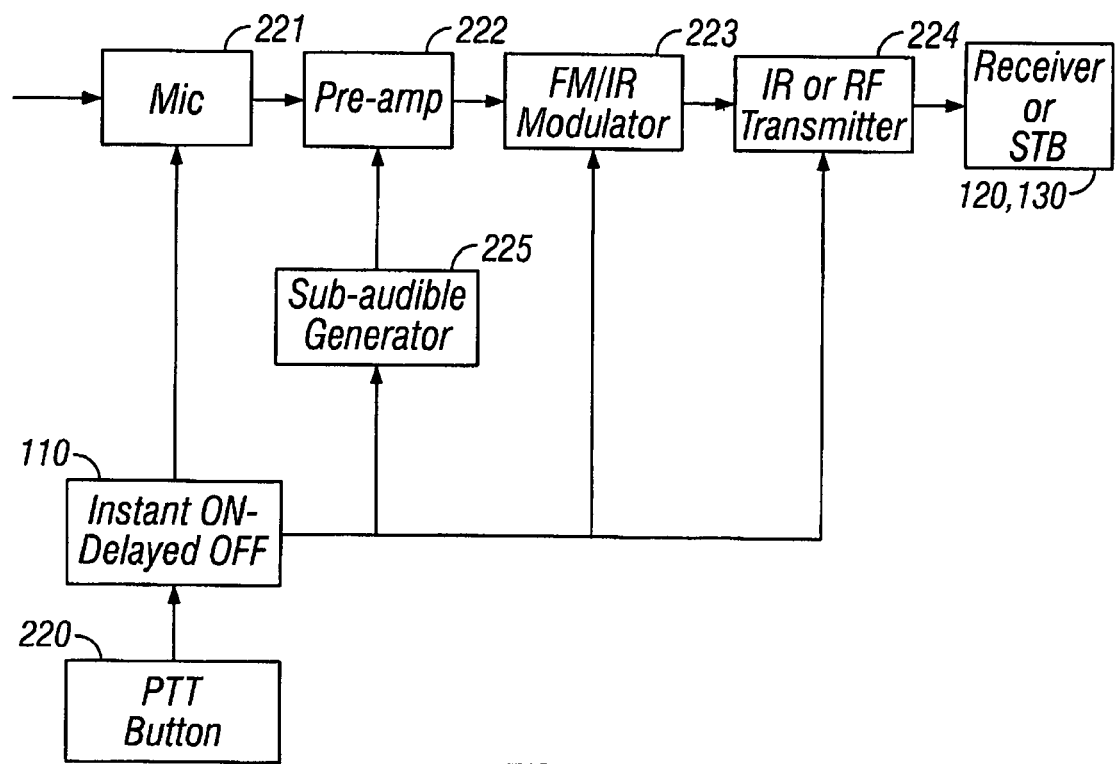
FIG. 11 is a diagram illustrating a remote control with an instant-on delay-off circuit according to the invention.

Often, a user releases the PTT button prior to finishing a voice command. FIG. 11 illustrates a timing circuit 1110 with an analog remote control transmitter. The timing circuit keeps the microphone 221, sub-audible generator 225, pre-amp 222, modulator 223, and transmitter 224 activated for a period of time after the user has released the PTT button 220. The period of time is typically from one hundred milliseconds to one second. The timing circuit is activated only when the PTT button is depressed for more than some minimal time. This enables fast clicks of the PTT button to control other functions.

Although the invention is described herein with reference to the preferred embodiment, one skilled in the art will readily appreciate that other techniques and applications may be substituted for those set forth herein without departing from the spirit and scope of the present invention. Accordingly, the invention should only be limited by the claims included below.

The invention claimed is:

1. A method for providing voice recognition processing at a cable television head-end unit for a plurality of voice controlled television cable set-top boxes in a cable television network, comprising the steps of:
   a television remote control receiving user-activated indication of a voice command;
   receiving said voice command through a microphone associated with said television remote control;
   said television remote control wirelessly transmitting a signal representing said voice command to a cable set-top box;
   said cable set-top box transmitting a signal representing said voice command via cable television link to a remotely located head-end unit;
   processing said voice command at said head-end unit;
   the head-end unit deriving a set-top-box-compatible command function corresponding to said voice command;
   the head-end unit transmitting said command function to said cable set-top box via the cable television link;
   performing said command function at said cable set-top box.

2. A method for providing voice recognition processing at a cable television head-end unit for a plurality of television controllers in a cable television network, comprising the steps of:
   a television remote control receiving indication of a voice command by user operation of an activation feature associated with the television remote control;
   receiving said voice command through a microphone associated with said television remote control;
   said television remote control wirelessly transmitting a signal representing said voice command to a television controller;
   said television controller transmitting a signal representing said voice command via cable television link to a remotely located cable head-end unit;
   the head-end unit deriving a controller-compatible command function corresponding to said voice command;
   the head-end unit transmitting said command function to said controller via the cable television link; and
   the controller performing said command function.

3. The method of claim 2, wherein the activation feature comprises a push-to-talk switch and activation of said push-to-talk switch comprises any of:
   pressing said push-to-talk switch, double pressing said push-to-talk switch, turning said push-to-talk switch clockwise and/or counterclockwise, and toggling said push-to-talk switch.

4. The method of claim 2,
   where the activation feature comprises a push-to-talk switch, and the steps further comprise, responsive to operation of the push-to-talk switch, performing functions including any of:
   activating said microphone, deactivating said microphone, activating a help menu, deactivating a help menu, activating a telephone, deactivating said telephone, adjusting the gain on said microphone, muting said microphone and performing a shift function.

5. The method of claim 2,
   where user operation of the activation feature comprises making one or more predetermined utterances to operate a voice-activation feature of the remote control.

6. The method of claim 2, wherein said remote control comprises a wireless transmitter employing any of the following wireless communication formats:
   infrared, ultrasonic, radio frequency transmission, burst transmission, a multiplexed signal, a transmission device that conforms to a Bluetooth Specification, and an infrared repeater.

7. The method of claim 2,
   where the television remote control includes a keypad and a first transmitter to wirelessly transmit signals representing user entries upon the keypad;
   where the operation of wirelessly transmitting the signal representing the voice command to the television controller employs a second transmitter separate from the first transmitter.

8. The method of claim 2,
   where the television remote control includes a keypad and a transmitter to wirelessly transmit signals representing user entries upon the keypad;
   where the operation of wirelessly transmitting the signal representing the voice command to the television controller employs the transmitter;
   where the steps further comprise distinguishing between signals representing the voice commands and the signals representing user entries upon the keypad by one or more of the following: using transmissions of same frequency and different phase, using different frequencies, using different header or footer information, including a sub-audible signal in one or both signals.

9. The method of claim 2,
   where the steps further comprise:
   the television remote control adding information to the signal representing the voice command transmitted to the television controller, said information contained in locations comprising any of:
   header data, footer data, a sub-audible signal.

10. The method of claim 9 wherein said information comprises any of:
    source of said voice command, identity of a user, on air signal, off air signal, beginning of a voice command, and end of a voice command.

11. The method of claim 2, further comprising converting signals representing said voice command into cepstrals, the converting step performed by any of:
    said remote control, said television controller, a wireless transmission receiver that receives signals from said remote control.

12. The method of claim 2, performing non-repudiation measures comprising any of:
    deriving a low bit rate codec of said voice command, determining the source of said voice command, analyzing said voice command for the identity of the user, and requiring the input of a code.

13. The method of claim 2, further comprising:
automatically delaying deactivation of the activation feature for a period of time after user activation of the activation feature.

14. The method of claim 2, further comprising the step of:
the head-end unit transmitting further command functions to the television controller for relay to the television remote control;
responsive to receiving the further command functions, the television controller wirelessly forwarding the further command functions to the remote control.

15. The method of claim 14,
further comprising:
responsive to receiving the further command functions, the remote control performing any of: adjusting the gain control of said microphone and muting said microphone.

16. The method of claim 14, further comprising the step of:
responsive to receiving the further command functions, the remote control wirelessly transmitting said command function to a wirelessly operated device.

17. The method of claim 2, where the step of deriving the controller-compatible command function includes any of: word recognition, semantic analysis.

18. An apparatus for providing voice recognition processing at a cable television head-end unit for a plurality of voice controlled television cable set-top boxes in a cable television network, comprising:
a television remote control including: activation means for receiving user-activated indication of a voice command, microphone means for receiving the voice command, and transmission means for wirelessly transmitting a signal representing the voice command to a cable television controller;
a cable television controller including receiver means for receiving the signal representing the voice command from the television remote control and transmitter means for transmitting a signal representing the voice command via cable television link to a remotely located head-end unit;
a head-end unit including processing means for deriving cable-television-controller-compatible command functions corresponding to signals representing the voice commands received from the cable television controllers, and transmission means for transmitting signals representing the command functions back to respective cable television controllers;
where the cable television controller additionally includes second receiver means for receiving the signals representing the command functions from the head-end unit via the cable television link, and where the cable television controller includes means responsive to receipt of the command functions for executing the command functions.

19. An apparatus for providing voice recognition processing at a cable television head-end unit for a plurality of television controllers in a cable television network, comprising:
a television remote control including: activation feature to receive user indication of a voice command, a microphone to receive the voice command, and a transmitter to wirelessly transmit a signal representing the voice command to a cable set-top box;
a cable set-too box including a receiver to receive the signal representing the voice command from the television remote control and a transmitter to transmit a signal representing the voice command via cable television link to a remotely located head-end unit;
a head-end unit to derive set-top-box-compatible command functions corresponding to signals representing voice commands received from the cable set-top-boxes and transmit signals representing the command functions back to respective cable set-too boxes;
where the cable set-top box additionally includes a second receiver to receive signals representing the command functions from the head-end unit via the cable television link, the cable set-top box responsive to receipt of the signals representing the command functions to execute the command functions.

20. The apparatus of claim 19, wherein said activation feature comprises a push-to-talk switch activated by any of:
pressing said push-to-talk switch, double pressing said push-to-talk switch, turning said push-to-talk switch clockwise and counterclockwise, and toggling said push-to-talk switch.

21. The apparatus of claim 19,
where the activation feature comprises a push-to-talk switch with functions comprising any of:
activating said microphone, deactivating said microphone, activating a help menu, deactivating a help menu, activating a telephone, deactivating said telephone, adjusting the gain on said microphone, muting said microphone, and performing a shift function.

22. The apparatus of claim 19,
where the activation feature is operated by receipt of one or more predetermined utterances.

23. The apparatus of claim 19, wherein said remote control comprises a wireless transmitter employing any of the following wireless communication formats:
infrared, ultrasonic, radio frequency transmission, burst transmission, a multiplexed signal, a transmission device that conforms to a Bluetooth Specification, and an infrared repeater.

24. The apparatus of claim 19,
where the television remote control includes a keypad and a first transmitter to wirelessly transmit signals representing user entries upon the keypad;
where the operation of wirelessly transmitting the signal representing the voice command to the cable set-top box employs a second transmitter separate from the first transmitter.

25. The apparatus of claim 19,
where the television remote control includes a keypad and a transmitter to wirelessly transmit signals representing user entries upon the keypad;
where the operation of wirelessly transmitting a signal representing the voice command to the cable set-top box employs the transmitter;
where the television remote control is configured to distinguish the signals representing the voice commands and the signals representing user entries upon the keypad by one or more of the following: using transmissions of same frequency and different phase, using different frequencies, using different header or footer information, including a sub-audible signal in one or both signals.

26. The apparatus of claim 19,
where the television remote control is configured to add information to the signal representing the voice command transmitted to the cable set-top box, where said information is contained in locations comprising any of:
header data, footer data and a sub-audible signal.

27. The apparatus of claim 26 wherein said information comprises any of:
source of said voice command, identity of a user, on air signal, off air signal, beginning of a voice command, and end of a voice command.

28. The apparatus of claim 19,
where one of the following is configured to convert signals representing the voice command into cepstrals:
said remote control, said cable set-top box, a wireless transmission receiver that receives said transmission from said remote control.

29. The apparatus of claim 19, the television remote control further configured to automatically delay deactivation of the activation feature for a period of time after user activation.

30. The apparatus of claim 19, where:
the head-end unit is configured to transmit further command functions to the set-top box for relay to the remote control;
the set-top box is configured, responsive to receiving the further command functions, to forward the further command functions to the remote control.

31. The apparatus of claim 30,
where the remote control is configured, response to receiving the further command functions, to perform any of: adjusting the gain control of said microphone and muting said microphone.

32. The apparatus of claim 30,
the remote control is further configured, responsive to receiving the further command functions, to wirelessly transmit said command functions to a wirelessly operated device.

33. The apparatus of claim 19, where the head-end unit is programmed such that deriving the set-top-box-compatible command function includes any of: word recognition, semantic analysis.

34. A centralized multi-user voice operated television control system, comprising:
television remote controls configured to directly and wirelessly control television sets and additionally to receive user voice input and wirelessly transmit first output representative of the voice input to television set-top boxes;
television set top boxes configured to receive television input signals via cable television link and provide television output signals compatible with television sets, the set top boxes additionally responsive to receiving the first output from the television remote controls to transmit representative second output to a central processing station via the cable television link;
a centralized processing station configured to receive and process second output from a multitude of television set top boxes by applying voice recognition to the second output to identify user-intended voice commands, to derive set-top-box-compatible instructions to carry out the identified voice commands, and returning signals representing the instructions to respective top boxes via the cable television link;
where the set top boxes are further responsive to receiving the signals representing the instructions from the central processing station to execute the instructions.

35. The system of claim 34, where the television remote controls include circuitry to ignore user voice input except during activation of a user-operated activation feature.

36. The system of claim 34, where each television remote control includes a signature generator providing a predetermined signature signal concurrent with wireless transmission of the first output, and where the set top boxes are configured to prevent transmission to the central processing station of output from the television remote controls not containing the predetermined signature signal.

37. The system of claim 34,
where each television remote control includes a keypad and a first transmitter to wirelessly transmit signals representing user entries upon the keypad;
where the operation of wirelessly transmitting the first output employs a second transmitter separate from the first transmitter.

38. The system of claim 34,
where each television remote control includes a keypad and a transmitter to wirelessly transmit signals representing user entries upon the keypad;
where the operation of wirelessly transmitting the first output employs the transmitter;
where each television remote control is further configured to distinguish the first output from signals representing user entries upon the keypad by one or more of the following: using transmissions of same frequency and different phase, using different frequencies, using different header or footer information, including a sub-audible signal in one or both signals.

39. The system of claim 34, where:
the set top boxes are configured to only execute certain identified commands, and for other commands, to wirelessly forward a representative fourth output representing the other commands to the television remote controls;
the television remote controls further include receivers to receive the fourth output, and are further configured to directly control wireless devices by wirelessly transmitting signals representing the fourth output.

40. A centralized multi-user voice operated television control system, comprising:
a plurality of television remote control means each for directly and wirelessly controlling television sets and additionally receiving user voice input and wirelessly transmitting first output representative of the voice input to a television set-top box means;
a plurality of television set top box means each for receiving television input signals via cable television link and providing television output signals compatible with television sets, and responsive to receiving the first output from one of the television remote control means to transmit representative second output to a central processing station via the cable television link;
a centralized processing station configured to receive and process second output from a multitude of television set top box means by applying voice recognition to the second output to identify user-intended voice commands, to derive set-top-box-means-compatible instructions to carry out the identified voice commands, and returning signals representing the instructions to respective set top box means via the cable television link;
where each set top box means is further responsive to receiving the signals representing the instructions from the central processing station to execute the instructions.

41. A method for operating a centralized multi-user voice operated television control system that includes a multitude of television remote controls situated at various television viewing sites, a multitude of set top boxes situated at the television sites to receive television input signals via cable television link and provide television output signals compatible with television sets at the television viewing sites, and a centralized processing station remote from the television viewing sites and coupled to the set top boxes via the cable television link, the method comprising operations of:

operating the television remote controls to perform additional operations including receiving user voice input and wirelessly transmitting first output representative of the voice input to set-top boxes;

operating the set top boxes to perform additional operations including, responsive to receiving the first output from the television remote controls, transmitting representative second output to a central processing station via the cable television link;

operating the centralized processing station to receive and process second output from a multitude of set top boxes by applying voice recognition to the second outputs to identify user-intended voice commands, to derive set-top-box compatible instructions to carry out the identified voice commands, and to return signals representing the instructions to the set top boxes via the cable television link;

operating the set top boxes to perform further operations including, responsive to receiving the signals representing the instructions from the central processing station, executing the instructions.

* * * * *